(12) United States Patent
Chen et al.

(10) Patent No.: US 8,985,543 B2
(45) Date of Patent: Mar. 24, 2015

(54) MOBILE DEVICE CASE WITH A SPRING LOADED STAND

(71) Applicant: Superior Communications, Inc., Irwindale, CA (US)

(72) Inventors: George Chen, Chatsworth, CA (US); Mervyn Cheung, Alhambra, CA (US)

(73) Assignee: Superior Communications, Inc., Irwindale, CA (US)

( * ) Notice: Subject to any disclaimer, the term of this patent is extended or adjusted under 35 U.S.C. 154(b) by 253 days.

(21) Appl. No.: 13/835,195

(22) Filed: Mar. 15, 2013

(65) Prior Publication Data

US 2014/0262854 A1  Sep. 18, 2014

(51) Int. Cl.
| | |
|---|---|
| A47B 97/04 | (2006.01) |
| A45C 11/00 | (2006.01) |
| F16M 11/10 | (2006.01) |
| A45C 13/00 | (2006.01) |

(52) U.S. Cl.
CPC ............... *A45C 11/00* (2013.01); *F16M 11/10* (2013.01); *A45C 13/004* (2013.01); *A45C 2011/002* (2013.01)
USPC ... 248/460; 248/223.41; 248/371; 206/45.24; 379/454

(58) Field of Classification Search
CPC .. A45C 2011/022; A45C 11/00; F16M 11/00; F16M 11/105; F16M 11/38; F16M 13/00; A47B 23/042; A47B 23/043; A47B 23/044; H04M 1/12
USPC .................... 248/460, 461, 463, 371, 221.11, 248/220.22, 220.21, 223.41; 206/45.24; 379/454, 455; 455/575.1
See application file for complete search history.

(56) References Cited

U.S. PATENT DOCUMENTS

| | | | |
|---|---|---|---|
| 4,645,275 | A | 2/1987 | Pucci |
| 4,989,926 | A | 2/1991 | Snow, Jr. |
| 5,607,054 | A | 3/1997 | Hollingsworth |
| 5,718,401 | A | 2/1998 | Walters |
| 5,871,094 | A | 2/1999 | Leibowitz |
| 6,729,518 | B2 | 5/2004 | Badillo et al. |
| 6,772,879 | B1 | 8/2004 | Domotor |
| 7,042,713 | B2 | 5/2006 | Nicolosi |
| 7,191,926 | B1 | 3/2007 | Constantino et al. |
| 7,270,255 | B2 | 9/2007 | Badillo et al. |
| 7,597,225 | B2 | 10/2009 | Badillo et al. |
| 7,775,356 | B2 | 8/2010 | Palmer |
| 7,819,247 | B2 | 10/2010 | Gonzalez |
| 8,312,991 | B2 | 11/2012 | Diebel et al. |
| 8,328,008 | B2 | 12/2012 | Diebel et al. |
| 8,382,059 | B2 * | 2/2013 | Le Gette et al. ............... 248/460 |
| 8,459,453 | B2 | 6/2013 | Parker et al. |
| 8,540,205 | B2 * | 9/2013 | Zhang et al. ................... 248/688 |
| 8,693,192 | B2 * | 4/2014 | Hsieh et al. ............... 361/679.59 |
| 2002/0017545 | A1 | 2/2002 | Badillo et al. |
| 2004/0206796 | A1 | 10/2004 | Badillo et al. |
| 2005/0264988 | A1 | 12/2005 | Nicolosi |

(Continued)

*Primary Examiner* — Todd M Epps
(74) *Attorney, Agent, or Firm* — Snell & Wilmer LLP

(57) ABSTRACT

An apparatus and/or systems related to a case for a mobile device. A protective case may include a stand portion which slides out to an open position for propping up the mobile device at a predetermined angle for viewing by a user. The stand portion has springs which hold the stand portion in the open position or a closed position. As the user switches the viewing orientation of the mobile device (e.g., by physically rotating the mobile device 90 degrees), the stand portion continues to prop up the mobile device at the predetermined angle.

20 Claims, 8 Drawing Sheets

(56) References Cited

U.S. PATENT DOCUMENTS

| | | |
|---|---|---|
| 2005/0268772 A1 | 12/2005 | Schaff |
| 2007/0284404 A1 | 12/2007 | Badillo et al. |
| 2009/0178938 A1 | 7/2009 | Palmer |
| 2009/0284963 A1 | 11/2009 | Intravatola |
| 2010/0122924 A1 | 5/2010 | Andrews |
| 2010/0224532 A1 | 9/2010 | Gonzalez |
| 2010/0236454 A1 | 9/2010 | Parizek et al. |
| 2011/0284420 A1 | 11/2011 | Sajid |
| 2012/0077556 A1 | 3/2012 | McKendrick |
| 2012/0097831 A1 | 4/2012 | Olukotun et al. |
| 2012/0138494 A1 | 6/2012 | Thomas |
| 2012/0181196 A1 | 7/2012 | Mongan et al. |
| 2012/0199501 A1 * | 8/2012 | Le Gette et al. ........... 206/45.24 |
| 2012/0211377 A1 | 8/2012 | Sajid |
| 2012/0217175 A1 | 8/2012 | Oskui et al. |

* cited by examiner

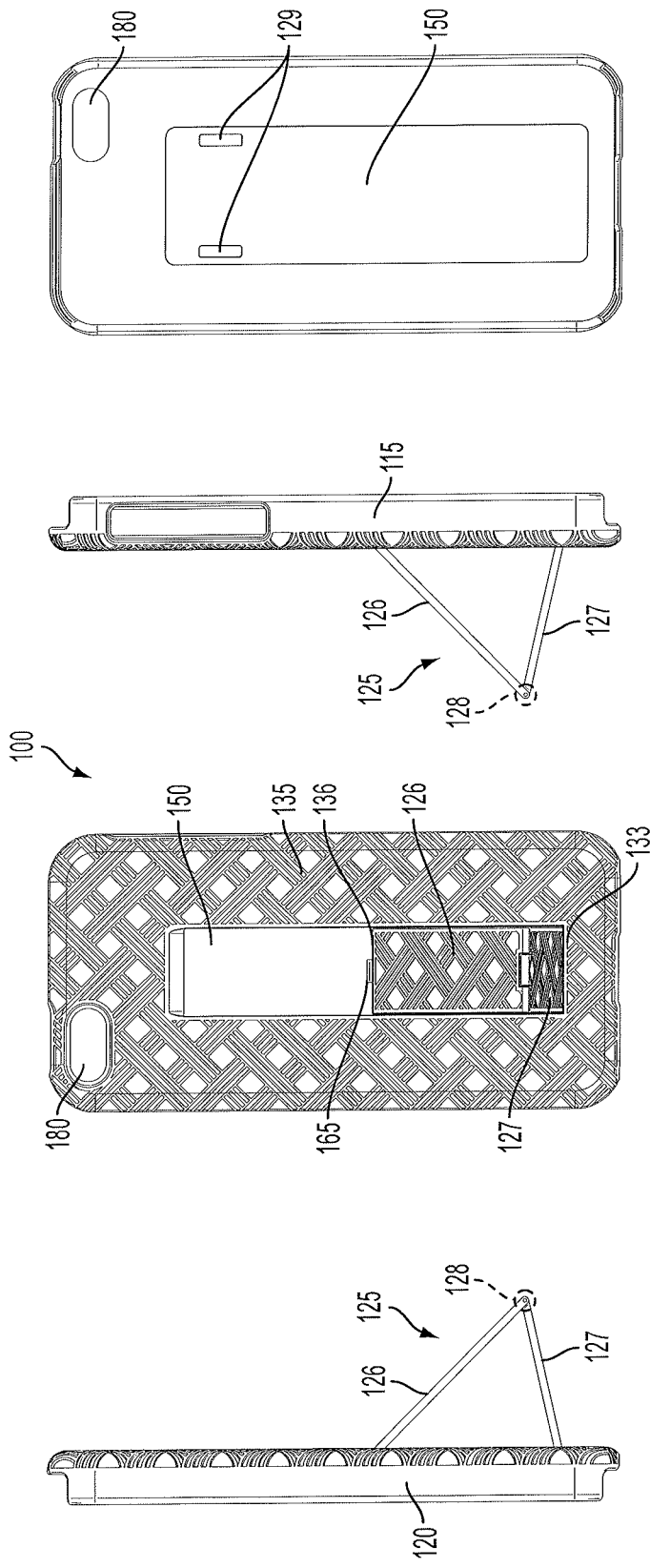

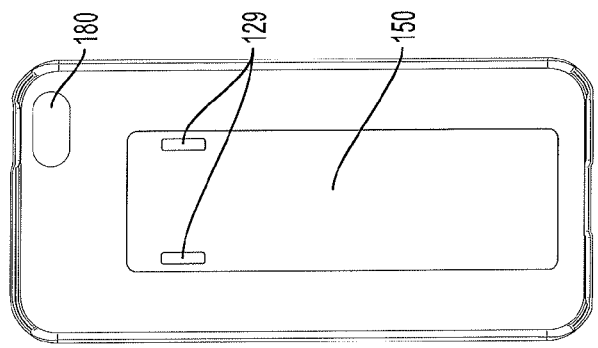
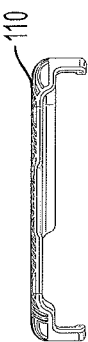
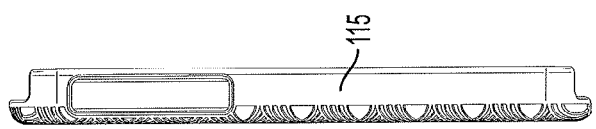
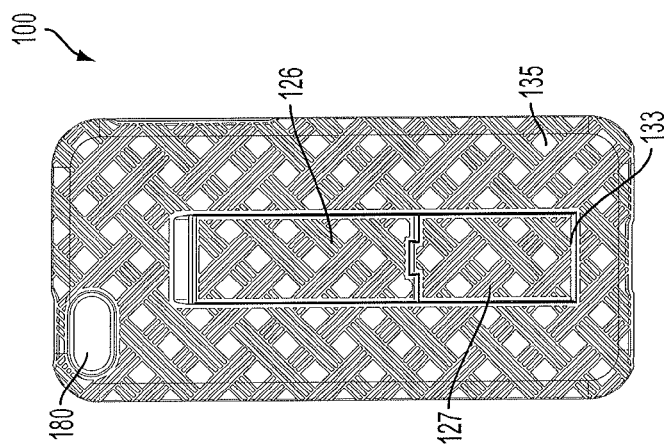
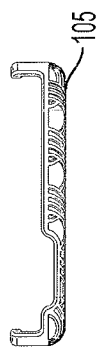
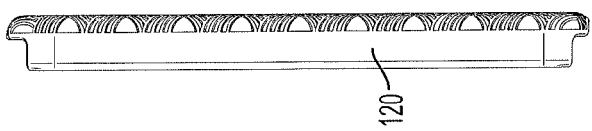

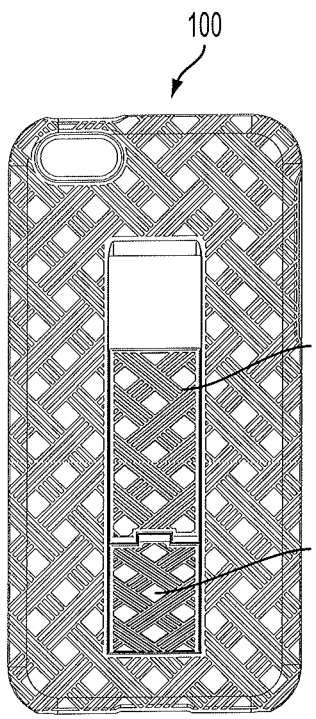
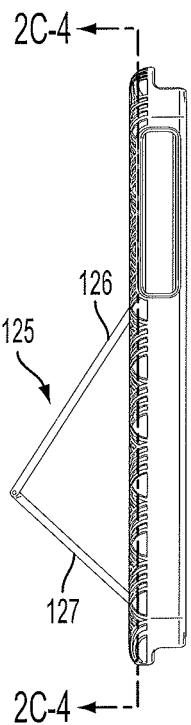
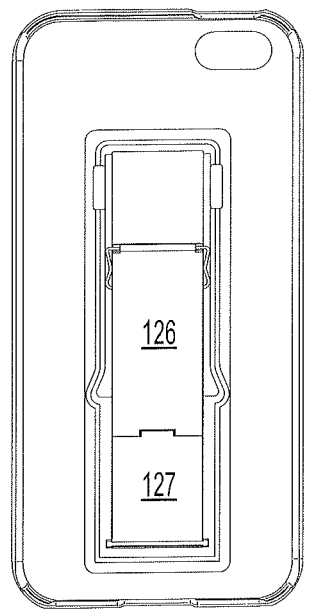
FIG. 2C-1  FIG. 2C-2  FIG. 2C-3
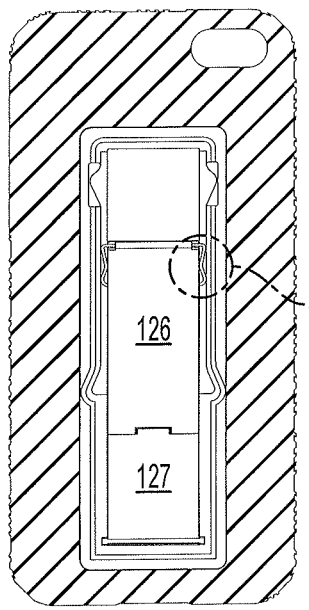
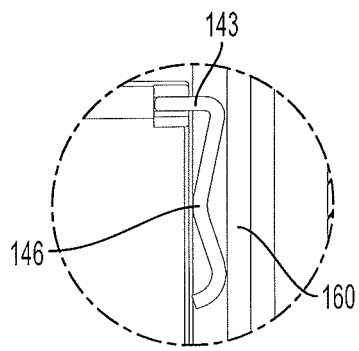
FIG. 2C-4  FIG. 2D

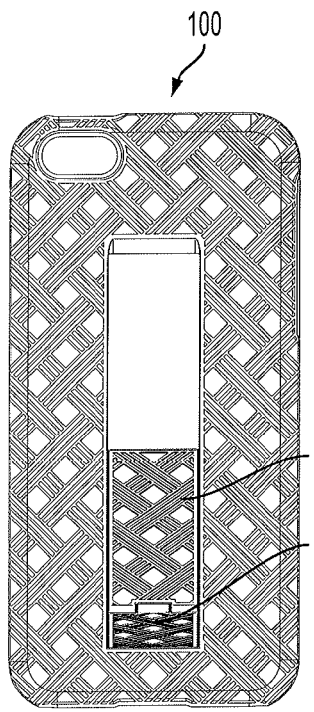 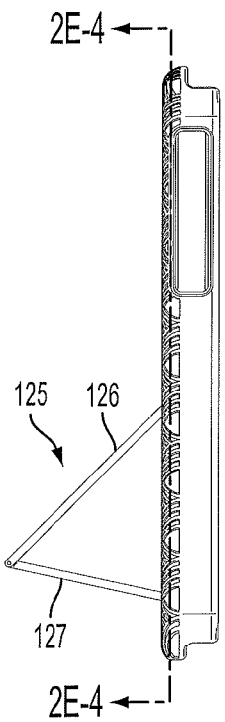 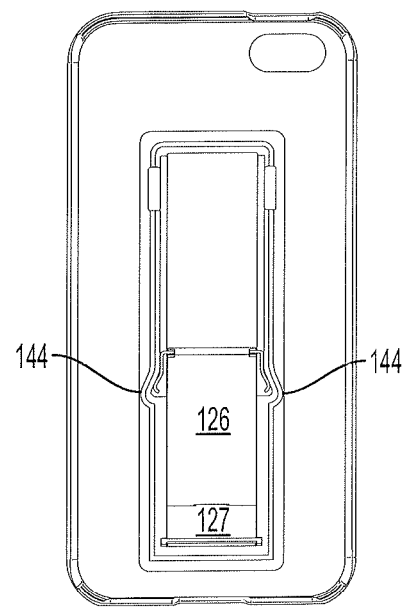
FIG. 2E-1　　FIG. 2E-2　　FIG. 2E-3
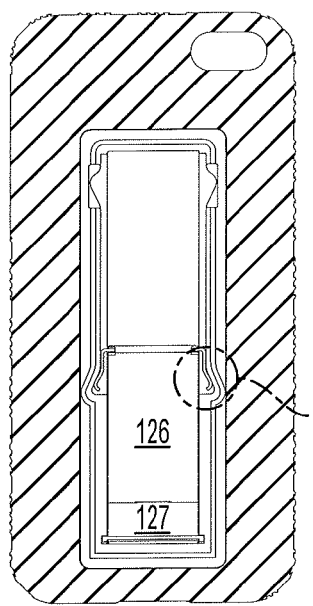 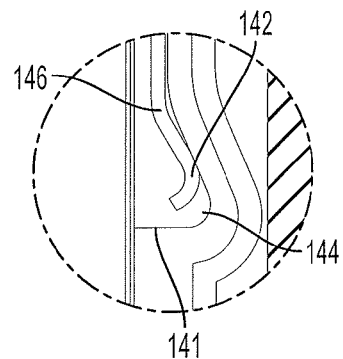
FIG. 2E-4　　FIG. 2F

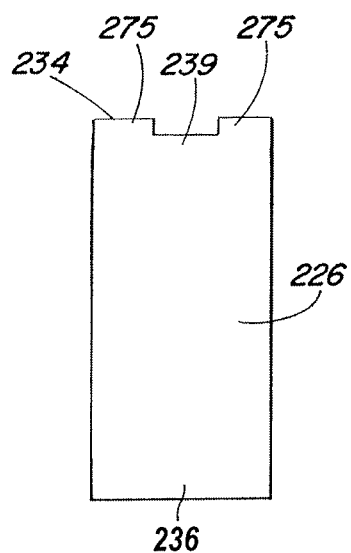
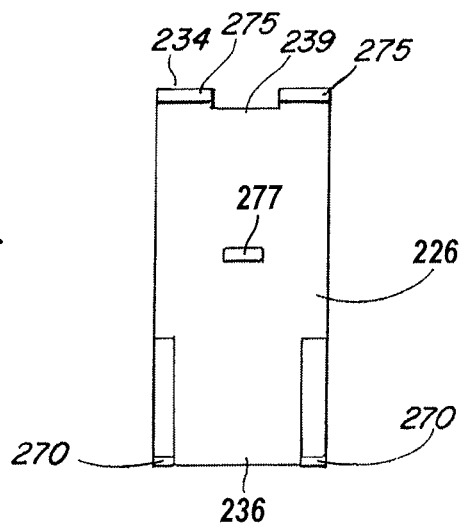
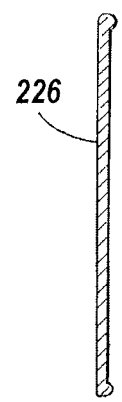
FIG. 3A    FIG. 3B    FIG. 3C
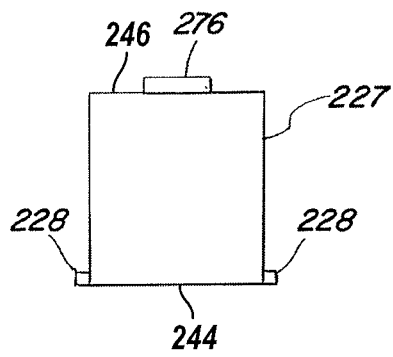
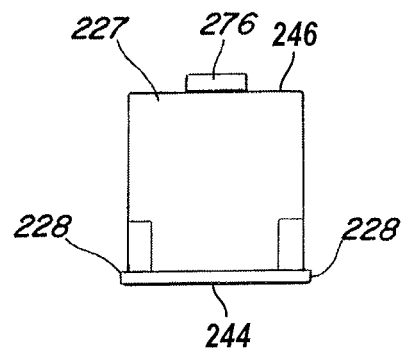
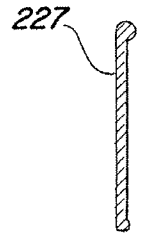
FIG. 3D    FIG. 3E    FIG. 3F

MOBILE DEVICE CASE WITH A SPRING LOADED STAND

BACKGROUND

1. Field

The present disclosure relates to an apparatus and/or systems related to a protective case or shell for a mobile device. The case may include a stand portion for propping up the mobile device for viewing by a user.

2. Description of Related Art

Mobile devices such as smartphones, tablet computers and the like are gaining widespread popularity. For example, millions of the Apple® iPhone® and the Apple® iPad® have been sold to date. The success of other major competitors such as Motorola®, Samsung®, HTC®, etc. only further confirms that consumers have adopted mobile devices. Consumers wish to protect and enhance the functionality of their products. Accordingly, manufacturers have produced different cases and other accessories to help the consumer keep their mobile devices safe.

However, certain of these cases do not allow a user to prop up the mobile device for hands-free viewing at a comfortable angle. Other cases which allow the user to prop up the mobile device are overly-complicated or unstable and require the user to test the various angles provided to determine a suitable angle which is both time consuming and requires significant effort on the part of the user. Other cases which allow the user to prop up the mobile device at a pre-defined, desired angle do not maintain the angle when the user switches orientation of the mobile device (e.g., changing the view from a "portrait-style" to a "landscape-style" by simply rotating the mobile device).

SUMMARY

The present disclosure relates to an apparatus and/or systems related to a case for a mobile device. The case may include a pull-out stand portion for propping up the mobile device at a predetermined angle for viewing by a user. As the user switches the viewing orientation of the mobile device (e.g., by physically rotating the mobile device 90 degrees), the pull-out stand continues to prop up the mobile device at the predetermined angle.

BRIEF DESCRIPTION OF THE DRAWINGS

The features, obstacles, and advantages of the present disclosure will become more apparent from the detailed description set forth below when taken in conjunction with the drawings, wherein:

FIGS. 1D-1 to 1D-6 illustrates multiple views of the protective case of FIG. 1A with the stand portion in the open position according to an implementation of the present disclosure.

FIG. 1E-1 to 1E-6 illustrates multiple views of the protective case of FIG. 1A with the stand portion in a closed position according to an implementation of the present disclosure.

FIGS. 2A-1 to 2A-4 illustrate multiple views of the protective case with the stand portion in the closed position according to an implementation of the present disclosure.

FIG. 2B illustrates a close up view of the spring in FIG. 2A according to an implementation of the present disclosure.

FIGS. 2C-1 to 2C-4 illustrate multiple views of the protective case with the stand portion partially open according to an implementation of the present disclosure.

FIG. 2D illustrates a close up view of the spring in FIG. 2C according to an implementation of the present disclosure.

FIGS. 2E-1 to 2E-4 illustrate multiple views of the protective case with the stand portion in the open position according to an implementation of the present disclosure.

FIG. 2F illustrates a close up view of the spring in FIG. 2E according to an implementation of the present disclosure.

FIG. 3A illustrates an outer side of a sliding plate of the protective case according to an implementation of the present disclosure.

FIG. 3B illustrates an inner side of the sliding plate of FIG. 3A according to an implementation of the present disclosure.

FIG. 3C illustrates a side view of the sliding plate of FIG. 3A according to an implementation of the present disclosure.

FIG. 3D illustrates an outer side of a pivoting plate of the protective case according to an implementation of the present disclosure.

FIG. 3E illustrates an inner side of a pivoting plate of FIG. 3D according to an implementation of the present disclosure.

FIG. 3F illustrates a side view of the pivoting plate of FIG. 3D according to an implementation of the present disclosure.

DETAILED DESCRIPTION

Apparatus, systems and/or methods that implement the implementations of the various features of the present disclosure will now be described with reference to the drawings. The drawings and the associated descriptions are provided to illustrate some implementations of the present disclosure and not to limit the scope of the present disclosure. Throughout the drawings, reference numbers are re-used to indicate correspondence between referenced elements.

Figure 1A:
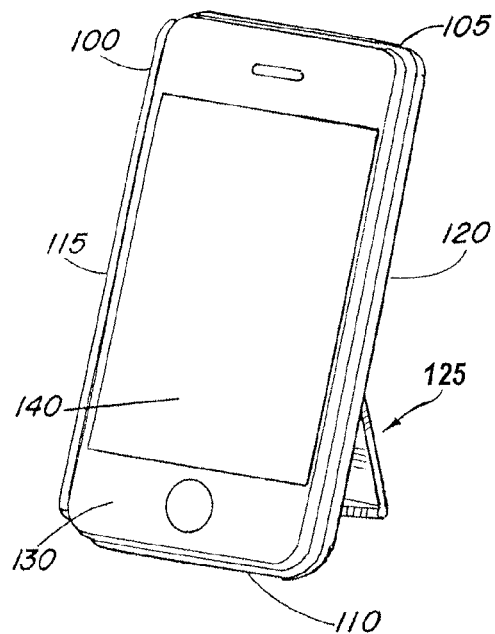
FIG. 1A illustrates a mobile device housed within a protective case with a stand portion in an open position according to an implementation of the present disclosure.

FIG. 1A illustrates an exemplary implementation of a protective case 100 housing a mobile device 130 by substantially covering the entire mobile device 130 except for the screen side and providing cutout portions to allow for access to certain portions of the mobile device 130 (e.g., a camera lens, various ports, switches, and the like). More particularly, the protective case 100 includes a top side 105, a bottom side 110, a left side 115, a right side 120 and a back side 135 while leaving the front side 140 available for viewing by the user. The protective case 100 further includes a stand portion 125.

Figure 1B:
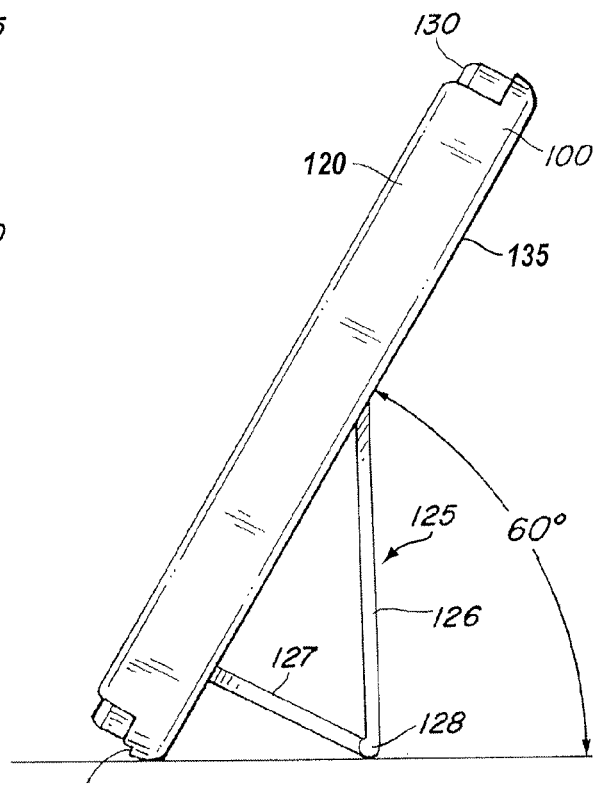
FIG. 1B illustrates a side view of the mobile device housed within the protective case of FIG. 1A propped up at an angle of about 60 degrees in a portrait-style orientation according to an implementation of the present disclosure.

FIG. 1B illustrates a side view of the right side 120 of the protective case 100. When the stand portion 125 is in an open position, the protective case 100 props up the mobile device 130 on a flat surface at a predetermined viewing angle. In FIG. 1B, the mobile device 130 is placed in a "portrait-style" orientation, advantageously providing a viewing angle of approximately 60 degrees (e.g., between about 50 degrees to about 70 degrees). The stand portion 125 includes a sliding plate 126 attached to a pivoting plate 127 at a hinge 128. When the stand portion 125 is engaged in the portrait-style orientation, only the bottom side 110 and the hinge 128 contact the flat surface. The bottom side 110 of the protective case 100 provides a stable contact point for propping up the mobile device 130. In addition, the hinge 128 advantageously provides a stronger, more stable contact point than a single kickstand structure because the hinge 128 is further supported by the sliding plate 126 and the pivoting plate 127 which may be held together by a pin, such as a pin 190 in FIG. 1G. In addition, the hinge 128 advantageously provides stability because the entire width of the hinge 128 serves as the contact point.

Figure 1C:
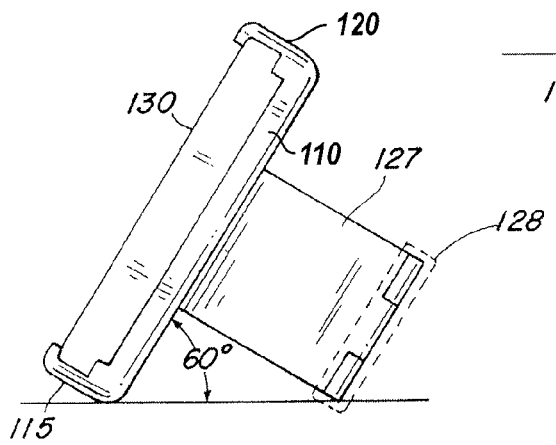
FIG. 1C illustrates a side view of the mobile device housed within the protective case of FIG. 1A propped up at an angle of about 60 degrees in a landscape-style orientation according to an implementation of the present disclosure.

The mobile device 130 may be placed in a "landscape-style" orientation by rotating the protective case 100 and the mobile device 130 clockwise or counterclockwise by 90 degrees. In FIG. 1C, the protective case 100 and the mobile device 130 seen in FIG. 1A have been rotated 90 degrees counterclockwise. The protective case 100 still allows the user to view the mobile device 130 substantially at the same viewing angle of approximately 60 degrees (e.g., between about 50 degrees to about 70 degrees). The left side 115 provides a broad and stable contact point. Alternatively, the right side 120 may provide the contact point, if the mobile device 130 was placed in the opposite landscape-style orientation. The hinge 128 again provides a contact point which is stronger and more stable than a single kickstand structure as it is supported by at least the sliding plate 126 and the pivoting plate 127 as well as the pin 190. Moreover, the use of two plates joined at a hinge reduces the likelihood of the stand portion 125 buckling under the weight of the protective case 100 and the mobile device 130. In this manner, the user may continue to view the mobile device 130 at the desirable 60 degree viewing angle without having to reposition himself.

Figure 1F:
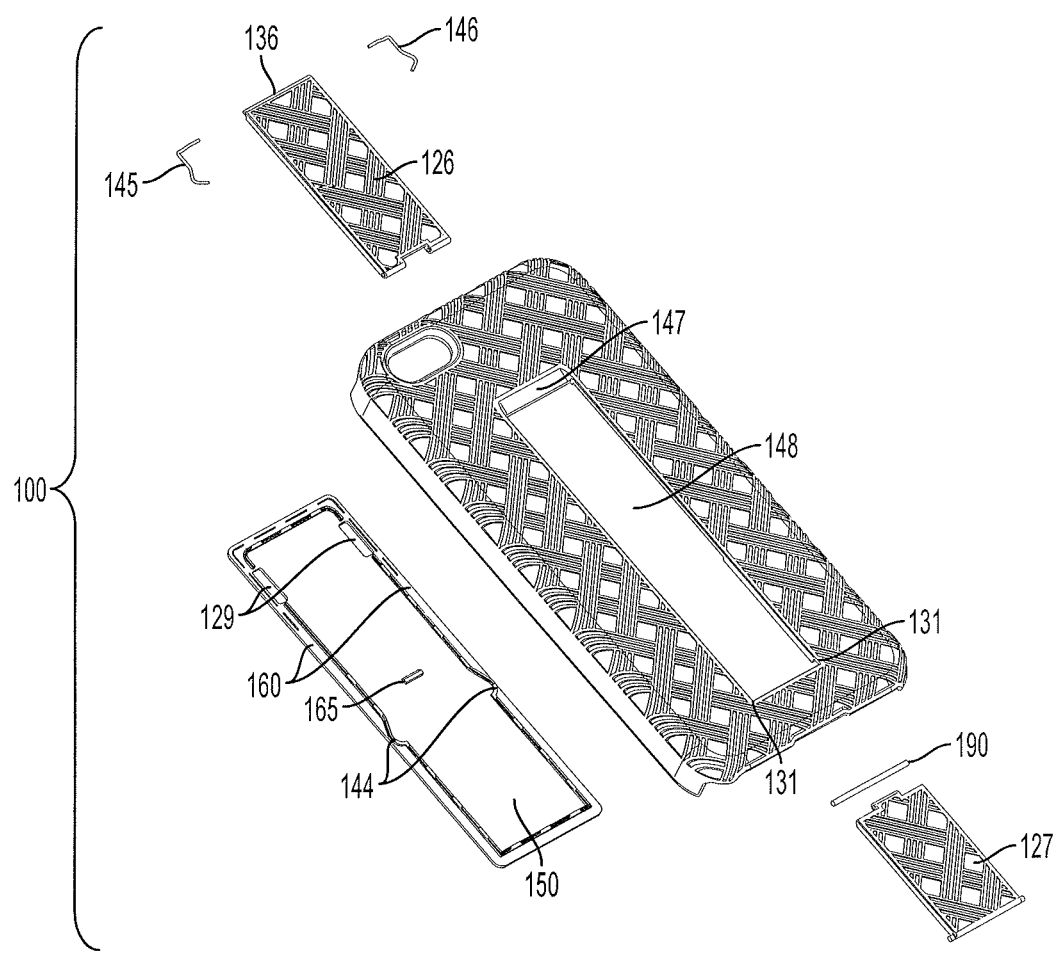
FIG. 1F illustrates a perspective deconstructed rear view of the protective case of FIG. 1A according to an implementation of the present disclosure.
Figures 1, 2, 2A, 3:
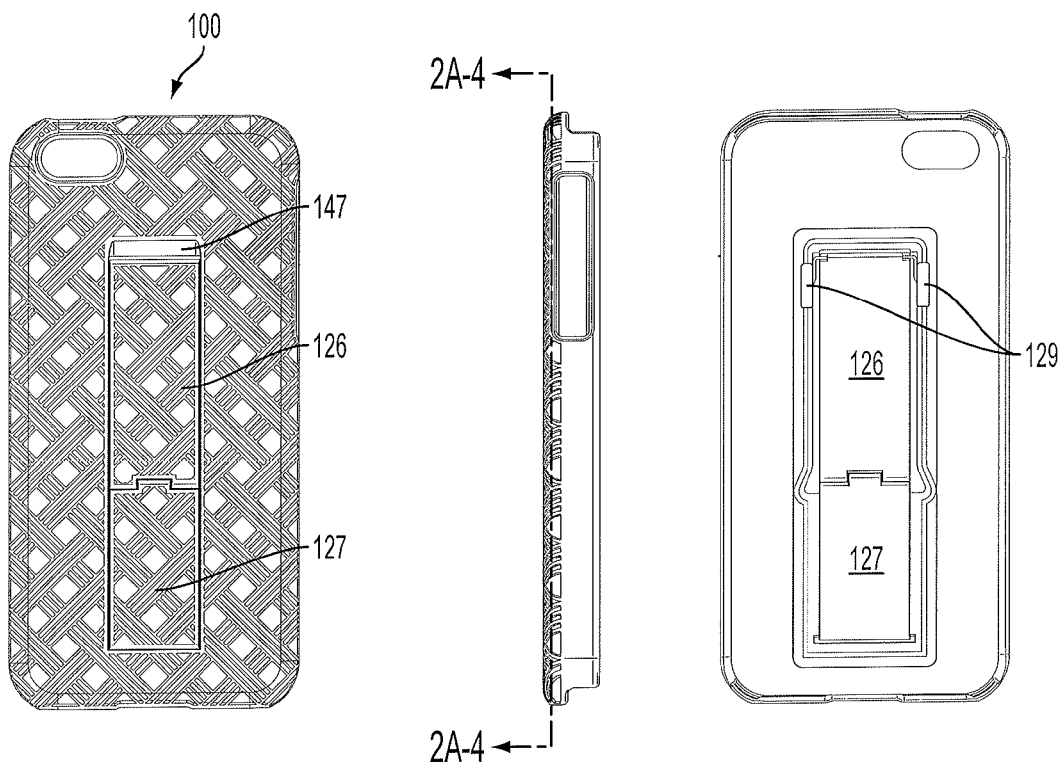

FIGS. 1D-1 to 1D-6 illustrate various angles of the protective case 100 without the mobile device 130. FIG. 1D-1 presents a right side view of the protective case 100. FIG. 1D-2 presents a back view of the protective case 100. FIG. 1D-3 presents a left side view of the protective case 100. FIG. 1D-4 presents a front view of the protective case 100. FIG. 1D-5 presents a top view of the protective case 100. FIG. 1D-6 presents a bottom view of the protective case 100. As seen in FIG. 1D-2, the back side 135 has a camera hole 180. Further seen in FIG. 1D-2, a stand receiving portion 150 is partially exposed when the stand portion 125 is in the open position. The sliding plate 126 slides along parallel tracks 160 (not visible in FIG. 1D-2, see FIG. 1F) until a non-pivot edge 136 of the sliding plate 126 is engaged. The sliding plate 126 is engaged by springs 145 and 146, described further below. The sliding plate 126 may optionally be engaged by a stopper 165, integrated on the stand receiving portion 150.

To retract the stand portion 125 back into the stand receiving portion 150, the user may maneuver the non-pivot edge 136 past the stopper 165. For example, the user may slightly lift the non-pivot edge 136 to disengage the stopper 165, which also disengages the springs 145 and 146. Once the non-pivot edge 136 is no longer engaged, the sliding plate 126 may slide towards the top side 105, and the pivoting plate 127 may pivot along a pivot edge 133. When fully retracted, the sliding plate 126 and the pivoting plate 127 flatten and become parallel with the back surface 135.

FIGS. 1E-2 illustrates the stand portion 125 flattened against the back side 135 and covering the stand receiving portion 150 to provide the user with a substantially flat back surface when the user no longer wishes to utilize the stand functionality. The stand portion 125 fully retracts into the stand receiving portion 150 so as not to impede the user's operation of the mobile device 130. FIGS. 1E-1 to 1E-6 present various views of the protective case 100 having the stand portion 125 closed. Specifically, FIG. 1E-1 presents a right side view of the protective case 100. FIG. 1E-2 presents a back view of the protective case 100. FIG. 1E-3 presents a left side view of the protective case 100. FIG. 1E-4 presents a front view of the protective case 100. FIG. 1E-5 presents a top view of the protective case 100. FIG. 1E-6 presents a bottom view of the protective case 100.

FIG. 1F illustrates an exploded view of the protective case 100. The stand portion 125 includes the sliding plate 126 and the pivoting plate 127, which are held together and form the hinge 128 with a pin 190. The non-pivot edge 136 of the sliding plate 126 houses the left spring 145 and the right spring 146.

The protective case 100 includes an indent 147 leading to an opening 148, which houses the stand receiving portion 150. The opening 148 further defines pivot grooves 131 for providing a pivot axis for the pivoting plate 127. The stand receiving portion 150 includes closing notches 129, engaging notches 144, the parallel tracks 160, and the stopper 165. The parallel tracks 160 may form sidewalls of the stand receiving portion 150.

The protective case 100, the sliding plate 126, the pivoting plate 127, and the stand receiving portion 150 are made of a protective material. The protective case 100, the sliding plate 126, the pivoting plate 127, and the stand receiving portion 150 may be made of polycarbonate, or other suitable materials. The exterior surfaces of the protective case 100, the sliding plate 126, and the pivoting plate 127 may also be patterned to provide additional grip as well as aesthetic design. The left spring 145, the right spring 146, and the pin 190 may be made of a durable material, such as metal.

FIGS. 2A-2F illustrate the operation of the kickstand. Portions of the stand receiving portion 150 are rendered transparent to depict the operation of the springs 145 and 146. FIGS. 2A-1 to 2A-4 depict the protective case 100 having the stand portion 125 closed. FIG. 2A-1 presents a back view of the protective case 100. FIG. 2A-2 presents a left side view of the protective case 100. FIG. 2A-3 presents a front view of the protective case 100, with portions of the stand receiving portion 150 rendered invisible to show the operation of the springs 145 and 146. FIG. 2A-4 presents a front view of the protective case 100 taken from the 2A-4-2A-4 line in FIG. 2A-2. The stand portion 125 is held closed by the springs 145 and 146 engaging the closing notches 129.

Figures 2, 2A, 2B, 3, 4:
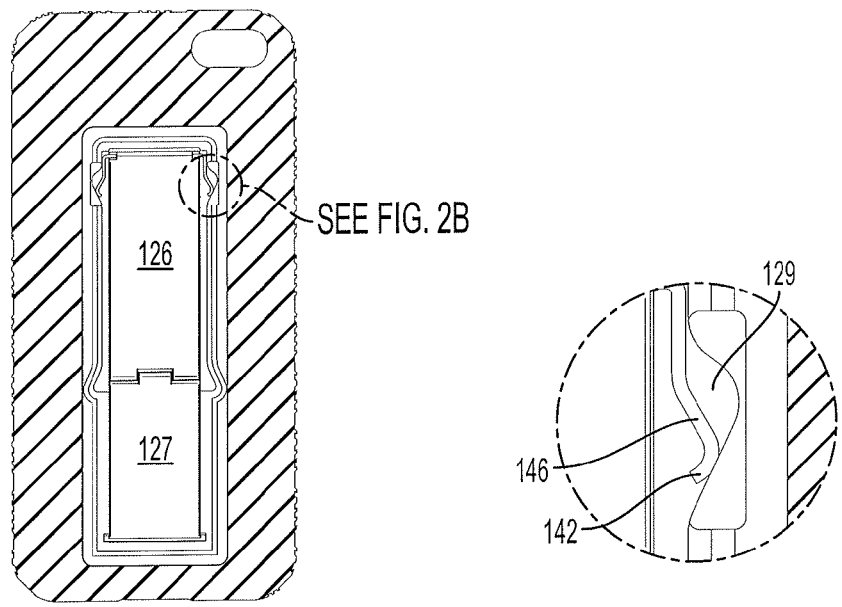

FIG. 2B illustrates a zoomed in view of the right spring 146 engaging the closing notch 129, as seen in FIG. 2A-4. The springs 145 and 146 flare out laterally, e.g. generally perpendicular to the direction the sliding plate 126 slides. When engaged in the closing notches 129, the springs 145 and 146 have space provided by the closing notches 129 to flare out, such that there is no compression in the springs 145 and 146. The springs 145 and 146 hold the stand portion 125 closed because the springs 145 and 146 must be compressed for the sliding plate 126 to slide down. In addition, when the user closes the stand portion 125, the engagement of the springs 145 and 146 produces a smoother click action.

To open the stand portion 125, the user may push against the sliding plate 126 at the indent 147. The indent 147 gives the user enough space for his finger to push against the sliding plate 126 and disengage the springs 145 and 146 from the closing notches 129. The springs 145 and 146 further include a curved portion 142, seen in FIG. 2B. The curved portion 142 allows the springs 145 and 146 to smoothly slide out of the slope of the closing notches 129 without being caught on any edges of the closing notches 129.

FIGS. 2C-1 to 2C-4 illustrate the stand portion 125 partially opened. FIG. 2C-1 presents a back view of the protective case 100. FIG. 2C-2 presents a left side view of the protective case 100. FIG. 2C-3 presents a front view of the protective case 100, with portions of the stand receiving portion 150 rendered invisible to show the operation of the springs 145 and 146. FIG. 2C-4 presents a front view of the protective case 100 taken from the 2C-4-2C-4 line in FIG. 2C-2. As the sliding plate 126 swings out, the springs 145 and 146 remain relatively flat against the stand receiving portion 150. As seen in FIG. 2D, springs 145 and 146 also include pivot portions 143. The sliding plate 126 receives the pivot portions 143 to allow the sliding plate 126 to swing out without being stopped by the springs 145 and 146.

The springs 145 and 146 are deflected inward by the parallel tracks 160, creating some compression in the springs 145 and 146. This compression is not too great to prevent the user from sliding the stand portion 125, but creates enough friction such that the stand portion 125 does not loosely swing between the open and closed positions.

FIGS. 2E-1 to 2E-4 illustrate the stand portion 125 in the open position. FIG. 2E-1 presents a back view of the protective case 100. FIG. 2E-2 presents a left side view of the protective case 100. FIG. 2E-3 presents a front view of the protective case 100, with portions of the stand receiving portion 150 rendered invisible to show the operation of the springs 145 and 146. FIG. 2E-4 presents a front view of the protective case 100 taken from the 2E-4-2E-4 line in FIG. 2E-2. The springs 145 and 146 engage the closing notches 129. The closing notches 129 have a shape corresponding to the shape of the springs 145 and 146. As seen in FIG. 2F, the closing notches 129 generally follow the shape of the curved portions 142 of the springs 145 and 146. The flat wall 141 of the closing notch 129 prevents the spring 146 from sliding further, which locks the stand portion 125 into the appropriate angle. When engaged in the engaging notches 144, the springs 145 and 146 have room to flare out without being deflected inward. The springs 145 and 146 prevent the stand portion 125 from closing because the springs 145 and 146 must compress for the sliding plate 126 to slide up. To close the stand portion 125, the user can use a finger to release the sliding plate 126 from the stopper 165 (not visible in FIG. 2E), and disengage the springs 145 and 146 from the engaging notches 144.

FIGS. 3A-3C illustrates a sliding plate 226, which may, in one implementation, be the sliding plate 126 of FIG. 1F. FIG. 3A depicts an outer surface of the sliding plate 226. As shown in FIG. 3A, the sliding plate 226 is flat, thin and rectangular shaped. The sliding plate 226 includes a pair of outer hinge portions 275, which are spaced apart and defining therebetween an inner hinge receiving portion 239 on a pivot edge 234. As illustrated in FIGS. 3B and 3C, the outer hinge portions 275 may appear to protrude in the direction of an inner surface of the sliding plate 226 and, in one or more implementations may actually incorporate hooks or hook-like devices. Moreover, in certain implementations, the outer hinge portions 275 may have a hole or similar opening for the pin 190 to extend through the outer hinge portions 275.

FIG. 3B shows an inner surface of the sliding plate 226. The sliding plate 226 includes a pair of grooves 270 on a non-pivot edge 236. The grooves 270 receive the pivot portions 143 of the springs 145 and 146. The inner surface of the sliding plate 226 includes a small groove 277. The small groove 277 is located such that it receives the stopper 165 when the sliding plate 226 is in the closed position, allowing the sliding plate 226 to fully retract and lay flat against the back side 135.

FIGS. 3D-3F illustrates a pivoting plate 227, which may, in one implementation, be the pivoting plate 127 of FIG. 1F. As shown in FIG. 3D, the pivoting plate 227 is flat, thin and rectangular shaped. Moreover, the pivoting plate 227 is shorter than the sliding plate 226 in order to achieve the desired viewing angle when the stand portion 125 is in the open position. The pivoting plate 227 includes a pair of pivot teeth 228 protruding from the pivoting plate 227 near a pivot edge 244. The pivot teeth 228 may, in one implementation, be inserted into pivot grooves 131 in FIG. 1F to allow the pivoting plate 227 to pivot between the closed position (where the pivoting plate 227 is substantially parallel and flat against the back side 135 of the protective case 100) and the open position (where the pivoting plate 227 is nearly perpendicular to the surface of the back side 135).

A hinge edge 246 is opposite the pivot edge 244. Near the hinge edge 246, the pivoting plate 227 includes an inner hinge portion 276. In one implementation, the inner hinge portion 276 may be longer than the inner hinge receive portion 239 of FIG. 3A and may further include hooks (not shown). In this manner, the inner hinge portion 276 substantially fills the inner hinge receiving portion 239 of FIG. 3A and is enabled to engage and mate with the outer hinge portion 275 of FIG. 3A to substantially form a hinge, such as the hinge 128. Further, the pin 190 may be configured to extend through the outer hinge portions 275 and the inner hinge portion 276 to strengthen the hinge 128 without restricting or limiting its movement. The hinge 128 allows the sliding plate 226 and the pivoting plate 227 to flatten out to the closed position (such that both the sliding plate 226 and the pivoting plate 227 are substantially parallel, flat and housed within the stand receiving portion 250) or be brought together such that they form an acute angle (e.g., a 40 degree to 50 degree angle) which enables the protective case 100 to sit at an approximately a 60 degree angle regardless of the orientation of the protective case 100. Other mating techniques for forming hinges known in the art may also be substituted and are within the spirit and scope of this disclosure.

FIG. 3E shows an inner surface of the pivoting plate 227. FIG. 3F shows a side view of the pivoting plate 227. As illustrated in FIGS. 3E and 3F, the inner hinge portion 276 may appear to protrude in the direction of an inner surface of the pivoting plate 227 and, in one or more implementations may actually incorporate hooks or hook-like devices. Moreover, in certain implementations, the inner hinge portion 276 may have a hole or similar opening for the pin 190 to extend through the inner hinge portion 276.

In one implementation, the sliding plate 226 may be about 54 millimeters (mm) by about 26 mm, and the pivoting plate 227 may be about 27 mm by about 26 mm. The stand receiving portion 250 may be about 81 mm by about 26 mm. The dimensions and ratios thereof allow the sliding plate 226 and the pivoting plate 227 to fit within the stand receiving portion 250 while providing the desirable, consistent viewing angle regardless of the orientation.

Furthermore, the protective case 100 may be constructed out of PC-110 which prevents shrinking, distortion or other undesirable defects. The outer surfaces of the protective case 100, in particular the back side 135 and the outer surfaces of the sliding plate 126 and the pivoting plate 127, may be textured or patterned for added grip.

The dimensions and materials discussed herein are only an example and are not intended to limit the scope of the disclosure. Indeed, one of ordinary skill in the art will recognize that the dimensions possible are limitless.

Certain implementations have been disclosed to clarify the concepts including the above structural configurations. However, one skilled in the art will recognize that an endless number of implementations may be performed with the concepts herein.

Unless otherwise indicated, all numbers expressing quantities of ingredients, volumes of fluids, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the disclosure and does not pose a limitation on the scope of the disclosure otherwise claimed. No language in the specification should be construed as indicating any non-claimed element essential to the practice of the disclosure.

Groupings of alternative elements or implementations of the disclosure disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain implementations of this disclosure are described herein, including the best mode known to the inventors for carrying out the disclosure. Of course, variations on these described implementations will become apparent to those of ordinary skill in the art upon reading the foregoing description. The inventor expects skilled artisans to employ such variations as appropriate, and the inventors intend for the disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Furthermore, certain references have been made to patents and printed publications throughout this specification. Each of the above-cited references and printed publications are individually incorporated herein by reference in their entirety.

Specific implementations disclosed herein may be further limited in the claims using consisting of or and consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Implementations of the disclosure so claimed are inherently or expressly described and enabled herein.

In closing, it is to be understood that the implementations of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

What is claimed is:

1. A case for a mobile device comprising:
   a body configured to cover the mobile device and having a top side, a bottom side, a left side, a right side, and a back side, the back side having a back surface defining a stand opening;
   a stand receiving portion within the stand opening;
   a pair of parallel tracks defined by the stand receiving portion; and
   a stand configured to hold the mobile device at a viewing angle when the stand is in an open position and configured to retract into the stand opening when the stand is in a closed position, the stand including:
      a sliding plate configured to fit within the stand opening in the closed position and slide within the pair of parallel tracks between the closed position and the open position,
      at least one spring connected to the sliding plate and configured to lock the sliding plate into the closed position and the open position; and
      a pivoting plate configured to fit within the stand opening in the closed position and connected to the sliding plate at a hinge;
      wherein the bottom side of the body and the hinge are contact points for holding the mobile device at the viewing angle in a portrait-style orientation, and the left side or the right side of the body and the hinge are contact points for holding the mobile device at the viewing angle in a landscape-style orientation.

2. The case of claim 1, wherein the stand receiving portion defines at least one notch for engaging the at least one spring when the stand is in the closed position.

3. The case of claim 1, wherein the stand receiving portion defines at least one notch for engaging the at least one spring when the stand is in the open position.

4. The case of claim 1, wherein the body further comprises at least one cutout opening for exposing ports of the mobile device.

5. The case of claim 1, wherein the sliding plate further comprises a small groove for receiving a stopper on the stand receiving portion in the closed position.

6. The case of claim 1, wherein the sliding plate further comprises an outer hinge portion, the pivoting plate further comprises an inner hinge portion, and the hinge further comprises a pin extending through the outer hinge portion and the inner hinge portion.

7. The case of claim 1, wherein the stand receiving portion further comprises a stopper configured to lock the sliding plate into the open position.

8. A case for a mobile device comprising:
a body configured to cover the mobile device and having a top side, a bottom side, a left side, a right side, and a back side, the back side having a back surface defining a stand opening;
a stand receiving portion within the stand opening;
a pair of parallel tracks defined by the stand receiving portion;
a stopper on the stand receiving portion; and
a stand configured to hold the mobile device at a viewing angle when the stand is in an open position and configured to retract into the stand opening when the stand is in a closed position, the stand including:
a sliding plate configured to fit within the stand opening in the closed position and within the pair of parallel tracks between the closed position and the open position;
at least one spring connected to the sliding plate and configured to lock the sliding plate into the closed position and the open position; and
a pivoting plate configured to fit within the stand opening in the closed position and connected to the sliding plate at a hinge;
wherein the bottom side of the body and the hinge are contact points for holding the mobile device at the viewing angle in a portrait-style orientation, and the left side or the right side of the body and the hinge are contact points for holding the mobile device at the viewing angle in a landscape-style orientation.

9. The case of claim 8, wherein the body further comprises at least one cutout opening for exposing ports of the mobile device.

10. The case of claim 8, wherein the sliding plate further comprises a small groove for receiving the stopper in the closed position.

11. The case of claim 8, wherein the sliding plate further comprises an outer hinge portion, the pivoting plate further comprises an inner hinge portion, and the hinge further comprises a pin extending through the outer hinge portion and the inner hinge portion.

12. The case of claim 8, wherein the viewing angle is approximately 60 degrees.

13. The case of claim 8, wherein the pivoting plate further comprises a pair of pivot teeth configured to fit within a groove defined by the stand opening such that the pivoting plate pivots along the pair of pivot teeth.

14. The case of claim 8, wherein the back surface, the sliding plate, and the pivoting plate has a textured outer surface.

15. A case for a mobile device comprising:
a body configured to cover the mobile device and having a top side, a bottom side, a left side, a right side, and a back side, the back side having a back surface defining a stand opening;
a pair of parallel tracks defined by the stand receiving portion;
a pair of closing notches defined by the stand receiving portion;
a pair of engaging notches defined by the stand receiving portion;
a stopper on the stand receiving portion; and
a stand configured to hold the mobile device at a viewing angle when the stand is in an open position and configured to retract into the stand opening when the stand is in a closed position, the stand including:
a sliding plate configured to fit within the stand opening in the closed position;
a pair of springs protruding from the sliding plate, free to pivot against the sliding plate and configured to slide along the pair of parallel tracks between the closed position and the open position, the sliding plate locked into the closed position when the pair of springs engages the pair of closing notches, and the sliding plate locked into the open position when the pair of springs engages the pair of engaging notches; and
a pivoting plate configured to fit within the stand opening in the closed position, the pivoting plate connected to the sliding plate at a hinge;
wherein the bottom side of the body and the hinge are contact points for holding the mobile device at the viewing angle in a portrait-style orientation, and the left side or the right side of the body and the hinge are contact points for holding the mobile device at the viewing angle in a landscape-style orientation.

16. The case of claim 15, wherein the body further comprises at least one cutout opening for exposing ports of the mobile device.

17. The case of claim 15, wherein the sliding plate further comprises a small groove for receiving the stopper in the closed position.

18. The case of claim 15, wherein the sliding plate further comprises an outer hinge portion, the pivoting plate further comprises an inner hinge portion, and the hinge further comprises a pin extending through the outer hinge portion and the inner hinge portion.

19. The case of claim 15, wherein the pivoting plate further comprises a pair of pivot teeth configured to fit within a groove defined by the stand opening such that the pivoting plate pivots along the pair of pivot teeth.

20. The case of claim 15, wherein the back surface further defines an indent adjacent the stand opening.

* * * * *